(12) United States Patent
Li et al.

(10) Patent No.: US 10,317,023 B2
(45) Date of Patent: Jun. 11, 2019

(54) FLEXIBLE LED LIGHT STRING

(71) Applicant: GUANGDONG OML TECHNOLOGY CO., LTD., Zhongshan, Guangdong Province (CN)

(72) Inventors: Xiaobing Li, Zhongshan (CN); Peiliang Zhang, Zhongshan (CN)

(73) Assignee: GUANGDONG OML TECHNOLOGY CO., LTD., Zhongshan (CN)

( * ) Notice: Subject to any disclaimer, the term of this patent is extended or adjusted under 35 U.S.C. 154(b) by 37 days.

(21) Appl. No.: 15/295,683

(22) Filed: Oct. 17, 2016

(65) Prior Publication Data

US 2017/0045187 A1 Feb. 16, 2017

(30) Foreign Application Priority Data

Oct. 16, 2015 (CN) .......................... 2015 1 0678727

(51) Int. Cl.
| | |
|---|---|
| F21S 4/24 | (2016.01) |
| B29C 47/00 | (2006.01) |
| B29C 47/02 | (2006.01) |
| B29C 47/04 | (2006.01) |
| F21V 3/02 | (2006.01) |
| F21Y 115/10 | (2016.01) |
| F21Y 103/10 | (2016.01) |
| B29L 31/34 | (2006.01) |
| F21V 3/06 | (2018.01) |

(52) U.S. Cl.
CPC ............ *F21S 4/24* (2016.01); *B29C 47/0066* (2013.01); *B29C 47/0069* (2013.01); *B29C 47/025* (2013.01); *B29C 47/043* (2013.01); *B29C 47/0014* (2013.01); *B29L 2031/34* (2013.01); *F21V 3/02* (2013.01); *F21V 3/0625* (2018.02); *F21Y 2103/10* (2016.08); *F21Y 2115/10* (2016.08)

(58) Field of Classification Search
CPC . F21Y 2103/10; F21Y 2115/10; F21V 23/009
See application file for complete search history.

(56) References Cited

U.S. PATENT DOCUMENTS

| | | | | |
|---|---|---|---|---|
| 6,074,074 | A * | 6/2000 | Marcus | ............. B29C 45/14655 362/234 |
| 7,815,341 | B2 * | 10/2010 | Steedly | ............... F21V 19/0055 362/217.01 |
| 9,072,171 | B2 * | 6/2015 | Simon | .................. H05K 3/0061 |
| 9,909,719 | B2 * | 3/2018 | Camarota | ................. F21V 5/04 |

(Continued)

*Primary Examiner* — Evan P Dzierzynski
(74) *Attorney, Agent, or Firm* — Hamre, Schumann, Mueller & Larson, P.C.

(57) ABSTRACT

A method for fabricating a flexible LED light string includes steps: 1: core strip extrusion molding; 2. LED light bead hole punching and cutting mark labelling; 3. inserting the flexible LED PCB into the core strip; 4. extrusion molding for light string sheath, i.e. diffusing strip. With the method, the core strip can has a variety of cross sectional shapes according to design needs. In the same way, the sheath can has a variety of cross sectional shapes according to design needs, and has a variety of combinations of materials and colors through multiple-color extrusion molding, for example, the sheath mixed with colored decorative strips, and non-transparent partially.

9 Claims, 4 Drawing Sheets

(56) References Cited

U.S. PATENT DOCUMENTS

| | | | |
|---|---|---|---|
| 2005/0195602 A1* | 9/2005 | Pan | F21V 21/0808 362/245 |
| 2009/0073693 A1* | 3/2009 | Nall | G09F 13/04 362/249.02 |
| 2009/0140271 A1* | 6/2009 | Sah | F21V 31/04 257/88 |
| 2011/0084630 A1* | 4/2011 | Cheng | A43B 1/0072 315/313 |
| 2015/0184808 A1* | 7/2015 | Wang | F21V 23/009 362/235 |

* cited by examiner

FLEXIBLE LED LIGHT STRING

TECHNICAL FIELD

The disclosure relates to light emitting diode (LED) illumination and, more particularly, to a method for fabricating a decorative all-weather flexible LED light string.

BACKGROUND

Flexible LED light strings have been widely used, playing important roles in household and businesses illumination areas. In an early stage, a typical method for making such flexible LED light strings includes inserting a flexible printed circuit board (PCB) with LED light beads surface-mounted into a silicone tube or a polyvinyl chloride (PVC) transparent tube, followed by heating the silicone tube or the PVC tube, causing it to shrink, so as to form a flexible LED light string. Such a method is suitable for producing the products with a simple structure only, as the coating process, i.e., coating the heat shrinking tube on the flexible LED PCB, cannot be easily controlled. In addition, for products having a complicated structure and multiple colors on the outside surface, its application is constrained, as the resulting products may be aesthetically unappealing and its production efficiency is low.

SUMMARY

A method for manufacturing a flexible LED light string includes:

step 1: extrusion molding a core strip, including feeding core wires into a forming die of a extrusion molding machine in which molten plastic is coated on an outer surface of the core wires continuously through the forming die, immersing and cooling a core strip produced in the forming die in coolant, and fully drying the core strip;

step 2: punching LED light bead holes and labeling cutting marks, including feeding the core strip into a punching die of a punching machine in which LED light bead holes are formed on one side of the core strip for receiving LED light beads, a size of the LED light bead holes and a distance between adjacent LED light bead holes corresponding to a size of LED light beads mounted on a flexible printed circuit board (PCB) and a distance between adjacent LED light beads mounted on the flexible LED PCB, respectively; labeling a cutting mark on a joint of each two adjacent branch circuits according to a predetermined number of LED light beads of the respective branch circuit;

step 3: inserting the flexible LED PCB into the core strip, wherein the LED light beads are mounted into the respective LED light bead holes, and connecting electrically power leads of the respective branch circuits of the flexible LED PCB to the core wires of the core strip;

step 4: extrusion molding a sheath for the flexible LED light string, i.e., a divergence strip, including feeding the core strip obtained in step 3 into a die of a multiple-color extrusion molding machine, while feeding a film strip into the die of the multiple-color extrusion molding machine as well, covering the film strip on a side of core strip where the LED light beads are located, continuously coating plastic materials with different colors and properties, which are contained separately in the multiple-color extrusion molding machine, on an outer surface of the core wires; and cooling down the flexible LED light string exited from the die of the multiple-color extrusion molding machine in coolant in a cooling tank, and fully drying the flexible LED light string.

Furthermore, before step 3, the following steps are adopted:

A) mounting the LED light beads onto the flexible LED PCB;

B) welding power leads, including connecting electrically power input and output leads of branch circuits to corresponding welding pads of the flexible LED PCB by welding.

Furthermore, step 4 further including:

straightening the core strip and the film strip by a straightening rack.

Furthermore, after step 4, the following step is adopted:

printing or stamping characters and patterns on a surface of the sheath.

Furthermore, in step 1, a temperature set for extrusion molding may range from 165° C. to 175° C.

Furthermore, in step 4, a temperature set for multiple-color extrusion molding may range from 165° C. to 175° C.

Furthermore, in step 2, the cutting mark is labeled in a way that a triangle hole is formed by punching in the joint of each two adjacent branch circuits.

Furthermore, the coolant used in steps 1 and 4 may be water.

By using the method described above, a resulting core strip can vary in its cross sectional shape according to design needs. Likewise, the sheath can have various cross sectional shapes according to design needs, and more particularly, can have a variety of combinations of materials and colors by multiple-color extrusion molding, for example, a sheath mixed with colored decorative strips, a partially opaque sheath, etc. As the film strip covers the core strip through extrusion molding (in which power leads have already been connected to the LED light beads and power source), a clearance between the film strip and he core strip is small (plastic materials are filled between the film strip and he core strip. A bonding between the film strip and he core strip is stable and firm, hence avoiding displacement and dislocation due to bending and pulling during use, which would affect the decorative effects of the final product. During the entire fabrication process, little manual intervention is required. The higher automatic fabrication level significantly improves its production efficiency, production stability and quality controllability.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the following description, various embodiments of the disclosure are described with reference to the following drawings, in which.

DETAILED DESCRIPTION

Figure 1:
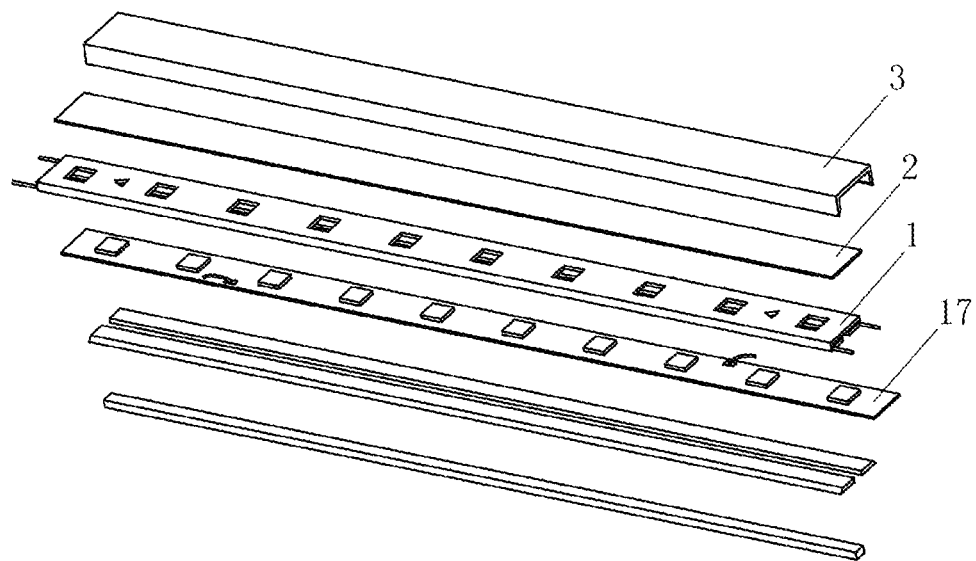
FIG. 1 shows a flexible LED light string fabricated by a method of the present disclosure.

FIG. 1 shows a type of flexible LED light string. The flexible LED light string includes a diffusion strip having a core strip, wherein the core strip includes LED beads and a flexible PCB. The diffusion strip further includes a strip disposed between the core strip and the diffusing string. The diffusing strip includes a light blocking strip and a transparent strip.

Figure 2:
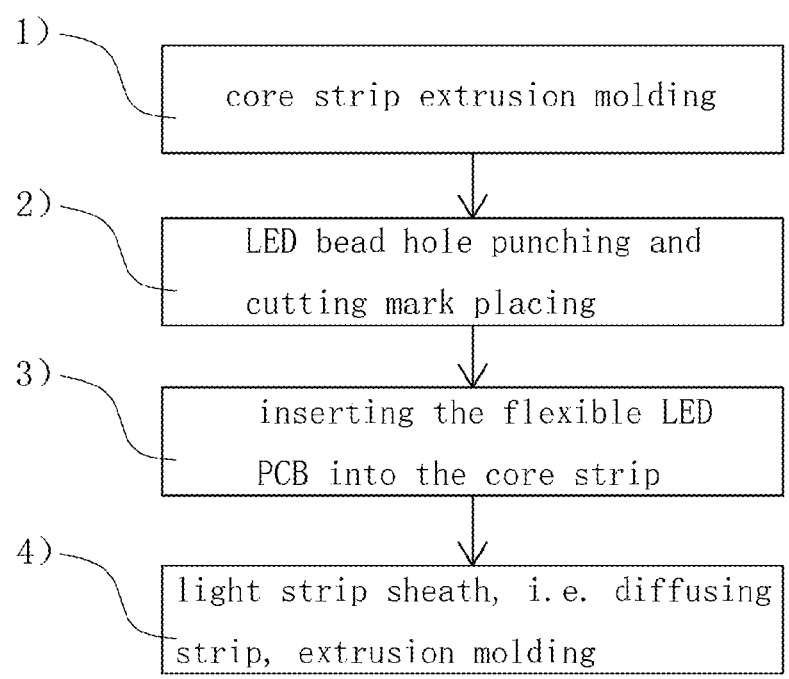
FIG. 2 is a block diagram of the method.
Figure 3:
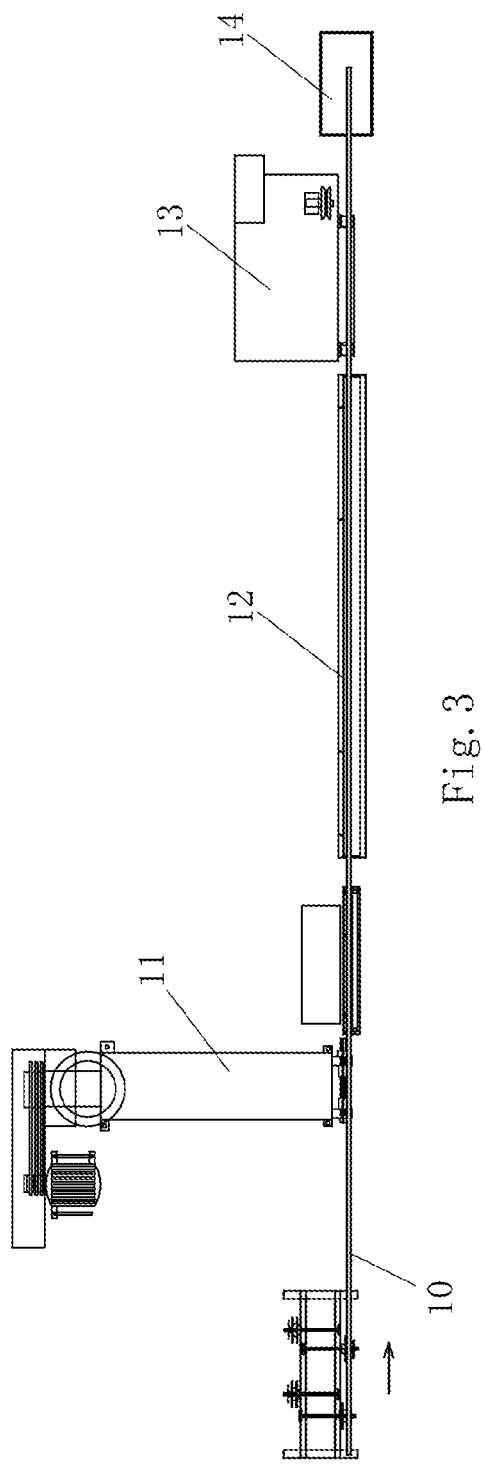
FIG. 3 is a fabrication flow chart of core strip extrusion molding.
Figure 4:
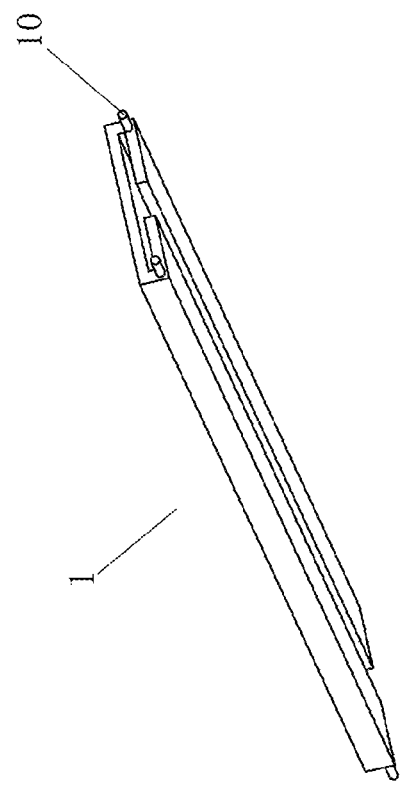
FIG. 4 is a schematic view of a core strip according to an embodiment.

As shown in FIG. 2, a method of fabricating a flexible LED light string includes the following steps:

Step 1. Core strip extrusion molding: as shown in FIG. 3, core wires 10 are fed from a roller into a forming die of an extrusion molding machine 11, whereby plastic materials in the extrusion molding machine are coated on the outer surface of the core wires 10 continuously through the forming die. The core strip 1 fabricated from the forming die is cooled in the coolant in a cooling tank 12, and then is completely dried. For better quality and higher production efficiency, the temperature for the extrusion molding is preferably selected from a range of 165° C. to 175° C. In consideration of the cost for production and the conveniences in production, the coolant is preferably water, due to its better cooling effect, easy to access, recyclability, and lower cost. Pulled by a dragger 13, the fully cooled core strip 1 moves forward and enters a storage rack 14. According to design needs, the core strip can be fabricated with a variety of cross sectional shapes, for example, as shown in FIG. 4.

Figure 5:
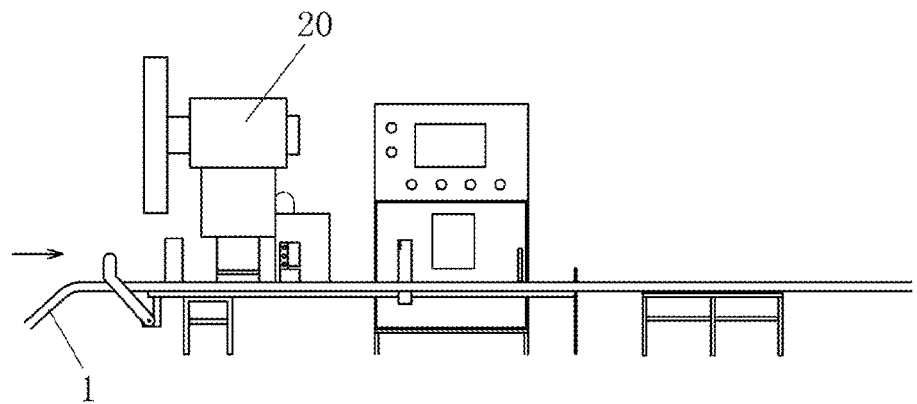
FIG. 5 is a fabrication flow chart of LED light bead hole punching and cutting mark labeling.
Figure 6:
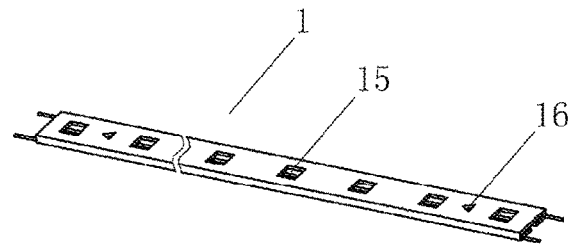
FIG. 6 is a schematic view of the core strip with light bead holes and cutting marls.

Step 2. LED light bead holes 15 punching and cutting mark 16 labelling: as shown in FIGS. 5 and 6, the core strip 1 is fed into a punching die of a punching machine 20, where LED light bead holes 15 are formed by punching in the side of the core strip where the LED light beads are mounted, of which the size of the LED light bead holes and the spacing between the LED light bead holes correspond to the size and spacing of the LED light beads mounted on the flexible LED PCB. According to a predetermined number of the LED light beads of the respective branch circuit, a cutting mark 16 is labeled on the joint of each two adjacent branch circuits. In a preferred embodiment, a way for labelling cutting mark may be to punch a triangle hole on the core strip at each of the joints of the adjacent branch circuits. This can be implemented easily by arranging an extra punching station in the punching machine, and no extra step is required, and thus no extra cost will incur.

Figure 7:
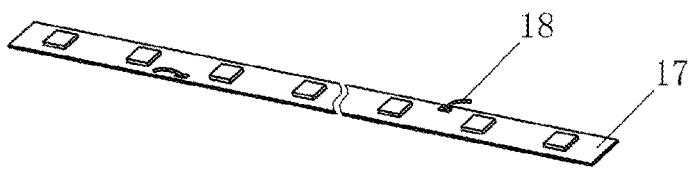
FIG. 7 is a schematic view of a flexible LED PCB.
Figure 8:
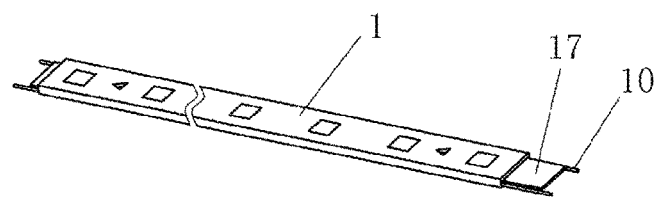
FIGS. 8 and 9 are front and rear views respectively of the flexible LED PCB mounted within the core strip.
Figure 9:
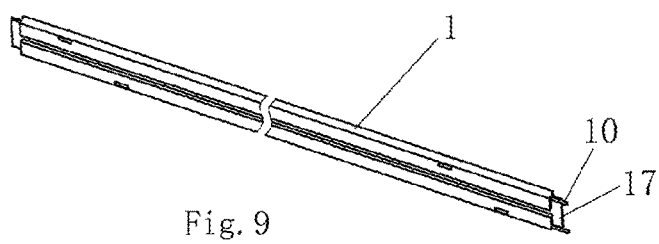

Step 3. Inserting the flexible LED PCB 17 into the core strip 1: as shown in FIGS. 7-9, the flexible LED PCB 17 is inserted into the core strip 1, while the LED light beads are being mounted into the light holes 15, and then power leads 18 of the branch circuits on the flexible LED PCB 17 are electrically connected to the core wires 10 in the core strip 1. For better automaticity and production efficiency, LED surface-mounting is made to secure the LED light beads to the flexible LED PCB 17 before the flexible LED PCB 17 is inserted into the core strip 1. The power leads 18, i.e., the power input and output leads of the branch circuits, are welded to the corresponding welding pads of the flexible LED PCB 17. This ensures the continuity and efficiency of the process. The assembled product is shown in FIG. 9.

Figure 10:
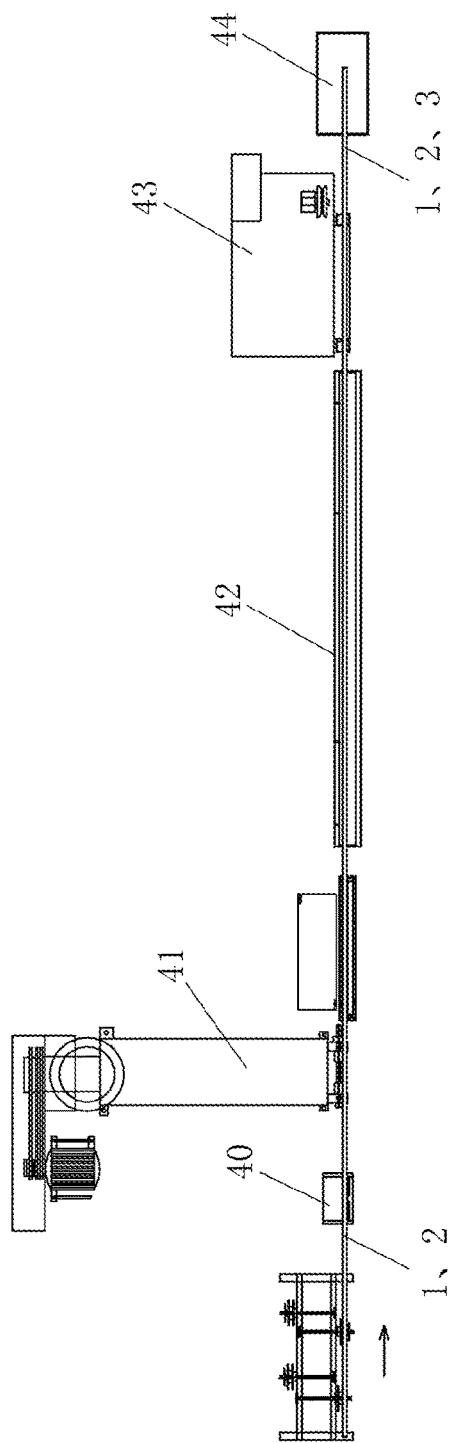
FIG. 10 is a fabrication flow chart of extrusion molding for sheath (i.e., a diffusion strip)
Figure 11:
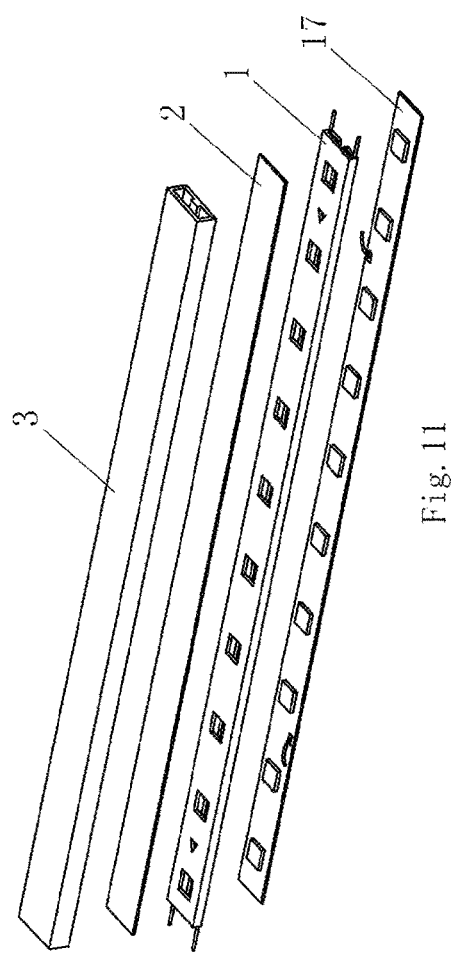
FIG. 11 is an exploded view of the flexible LED light string fabricated according to a method of the disclosure.

Step 4. Extrusion molding of light string sheath 3, i.e., a diffusing strip: as shown in FIG. 10, the core strip 1 obtained in step 3 is fed into a die of a multiple-color extrusion molding machine 41, while the film strip 2 is fed into the die of the multiple-color extrusion molding machine 41 as well. In the machine, the film strip 2 disposed cover a side of core strip 1 close to the light-emitting surfaces of the LED light beads, and the plastic materials of different colors and properties contained separately in the multiple-color extrusion molding machine 41 are continuously coated on the outer surface of the core wires. The flexible LED light string made in the forming die (its outer layer is the light string sheath 3) is cooled in the coolant of a cooling tank 42, and then fully dried. In this step the multiple-color extrusion molding process is adopted, such that a variety of materials are melted together, providing distinct layering effects, without seams. The resulting product has great adhesive strength (it cannot be torn from the interface between two materials easily), and there are no apparent defects, such as light reflection, in the interface affecting the effects of illumination and decoration. For example, in one process step, the sheath 3 can be fully transparent, or, transparent or semi-transparent on the side facing the light-emitting surfaces of the LED light beads and non-transparent on the other sides (the non-transparent sides are the opaque layers). For better product quality, the sheath 3 extrusion-molded is evenly coated on the outer surface of the core strip and film strip, and the core strip and film strip are subjected to a straightening process by a straightening rack 40, and the unqualified rate of the product is thus lowered. In order to have better product quality and higher production efficiency, the temperature for extrusion molding is selected from a range of 165° C.~175° C. In view of the costs in production and convenience in use, the coolant is preferably water, as water can provide good cooling effects with lower cost, and can be accessed easily and is recyclable. Pulled by a dragger 43, the fully cooled flexible LED light string moves forward and enters a storing rack 44. According to needs, the sheath 3, i.e., diffusing strip, can be fabricated with a variety of cross sectional shapes, and a preferred cross sectional shape for the sheath is shown in FIG. 11.

In order to pass more production information, such as precautions, product safety certificate, and manufacturer information including trademarks, LOGO and etc., by the product, after the step of extrusion molding for light string sheath, a step of printing or stamping letters or patterns on the surface of the product is adopted, for attaching some necessary safety marks to the product to remind the users, or for better texture.

With the method according to the invention, little manual intervention is required during the entire production process, thus higher automatic level, higher production efficiency, improved product stability, and better product quality controllability are obtained. Although the present disclosure has been described with reference to preferred embodiments, one skilled in the art will recognize that changes can be made in form and detail without departing from the spirit and scope of the present disclosure.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A flexible light emitting diode (LED) light string, comprising:
   a core strip including LED light bead holes;
   a flexible LED printed circuit board (PCB) inserted in the core strip, with each of LED light beads corresponding to a LED light bead hole, the flexible LED PCB including branch circuits, a cutting mark being disposed on a joint of each two adjacent branch circuits;
   power leads of the branch circuits connecting welding pads of the flexible LED PCB to respective core wires of the core strip;
   a film strip covering the core strip with the flexible LED PCB inserted; and
   a sheath coated on an outer surface of the core strip and the film strip,
   wherein the power leads of the branch circuits are input and output leads of the branch circuits,
   the film strip is disposed to cover a side of the core strip close to light-emitting surfaces of the LED light beads, and
   an outer surface of the core wires of the core strip is coated with plastic materials.

2. The flexible LED light string of claim 1, further comprising: characters and patterns formed on a surface of the flexible LED light string.

3. The flexible LED light string of claim 1, wherein the core wires of the core strip includes two wires extending in a longitudinal direction of the core strip, and
   the LED light beads, the LED light bead holes, and the cutting mark are disposed between the two wires.

4. The flexible LED light string of claim 1, wherein the sheath is transparent.

5. The flexible LED light string of claim 1, wherein the sheath is transparent at a side facing the light-emitting surfaces of the LED light beads, and is non-transparent at other sides of the sheath.

6. The flexible LED light string of claim 1, wherein the cutting mark is a triangle hole.

7. The flexible LED light string of claim 1, wherein the sheath is evenly coated on the outer surface of the core strip and the film strip.

8. The flexible LED light string of claim 1, wherein the flexible LED PCB is inserted into the core strip,
   the LED light beads are secured on the flexible LED PCB and mounted into the LED light bead holes of the core strip,
   the film strip covers the core strip and the flexible LED PCB, and
   the sheath covers an outer surface of the core strip, the film strip, and the flexible LED PCB.

9. A flexible light emitting diode (LED) light string, comprising:
   a core strip including LED light bead holes;
   a flexible LED printed circuit board (PCB) inserted in the core strip, with each of LED light beads corresponding to a LED light bead hole, the flexible LED PCB including branch circuits, a cutting mark being disposed on a joint of each two adjacent branch circuits;
   power leads of the branch circuits connecting welding pads of the flexible LED PCB to respective core wires of the core strip;
   a film strip covering the core strip with the flexible LED PCB inserted; and
   a sheath coated on an outer surface of the core strip and the film strip,
   wherein the power leads of the branch circuits are input and output leads of the branch circuits,
   the film strip is disposed to cover a side of the core strip close to light-emitting surfaces of the LED light beads,
   an outer surface of the core wires of the core strip is coated with plastic materials,
   the core wires of the core strip includes two wires extending in a longitudinal direction of the core strip, and the LED light beads, the LED light bead holes, and the cutting mark are disposed between the two wires,
   the sheath is transparent at a side facing the light-emitting surfaces of the LED light beads, and is non-transparent at other sides of the sheath,
   the sheath is evenly coated on the outer surface of the core strip and the film strip,
   the flexible LED PCB is inserted into the core strip,
   the LED light beads are secured on the flexible LED PCB and mounted into the LED light bead holes of the core strip,
   the film strip covers the core strip and the flexible LED PCB, and
   the sheath covers an outer surface of the core strip, the film strip, and the flexible LED PCB.

\* \* \* \* \*